April 10, 1956

H. A. JOHNSON 2,741,688

WELDING ELECTRODE

Filed April 24, 1953

*INVENTOR.*
HAROLD A. JOHNSON
BY
ATTORNEY

United States Patent Office 2,741,688
Patented Apr. 10, 1956

2,741,688
WELDING ELECTRODE
Harold A. Johnson, Milan, Ill.

Application April 24, 1953, Serial No. 350,883

4 Claims. (Cl. 219—4)

The present invention relates to electrodes for use in spot welding and has for its principal object the provision of a compact and improved fluid-cooled welding electrode that has greater electrical conductivity and is simpler, less expensive to manufacture, and is easier to assemble and disassemble than now known in the art. It is in the nature of an improvement over my previous design disclosed in my Patent No. 2,492,578, granted December 27, 1949.

More specifically, an object of this invention has to do with eliminating threaded parts through which electric current must pass during operation. Any dirt and grease that accumulate in the threads between the holder and the tip-securing bushing tend to increase the resistance to current flow, thus resulting in excess heating.

Another object has to do with eliminating any tapered holes and bushings, which are somewhat more expensive to make and contribute to the difficulty in separating the wedged-together parts during disassembly.

Still another object relates to the provision for maintaining a fluid-tight seal between the tip and holder to prevent leakage of fluid during operation.

These and other objects and advantages of my invention will become apparent to those skilled in the art after a consideration of the following description of a preferred embodiment, in which reference will be had to the drawings appended hereto, in which.

Figure 1:
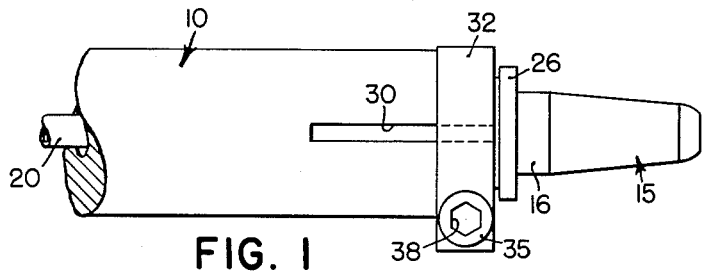
Figure 1 is a side elevational view of an electrode embodying the principles of my invention, all but the tip-supporting portion being broken away to simplify the disclosure.
Figure 2:
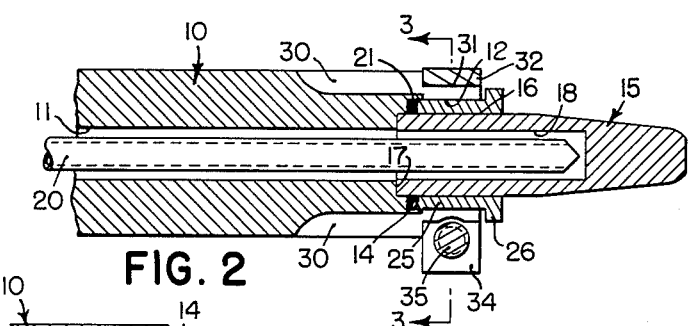
Figure 2 is a longitudinal sectional view taken along the axis of the electrode along a line 2—2 in Figure 3.
Figure 3:
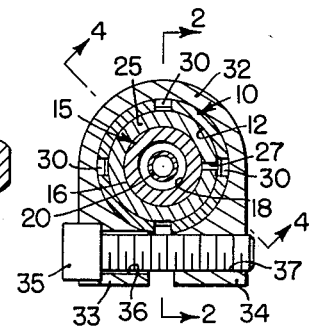
Figure 3 is a radial sectional view taken along a line 3—3 in Figure 2.
Figure 4:
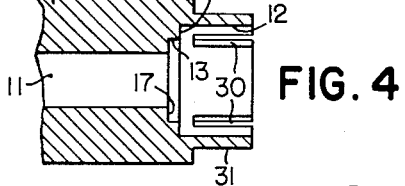
Figure 4 is a sectional view of the holder taken along a line 4—4 in Figure 3, with the other parts removed.

Referring now to the drawings and more particularly to Figures 1 to 4, inclusive, the electrode comprises a tubular holder 10, generally cylindrical in form and having an axially extending fluid passage 11 between the two ends of the holder. In the outer or tip end of the holder is a cylindrical recess 12 coaxial with the passage 11. At the inner end of the recess 12 is a second cylindrical recess 13 of smaller diameter, providing an annular shelf 14 in a radial plane. Both the inner recess 13 and the outer recess 12 constitute enlargements of the passage 11 and communicate therewith.

A welding tip 15, the outer end of which is slightly tapered, is provided with a cylindrical shank 16, which is inserted through the outer recess 12 and seats or abuts against the end wall 17 at the inner end of the recess 13. The diameter of the shank 16 is substantially equal to the diameter of the inner recess 13 and is slidable therein. The tip has an axial recess 18 in register with the passage 11 serving as a return or exhaust duct for the cooling water or other fluid that is introduced into the recess 18 by means of a tube 20, which extends coaxially through the passage 11 and recess 18.

An annular sealing member 21 in the form of an O-ring of resilient material, such as rubber, encircles the tip shank and engages the shelf 14. The inner diameter of the member 21 is substantially equal to the outer diameter of the shank 16 and the outer diameter of the member 21 is substantially equal to the diameter of the recess 12.

A split cylindrical bushing 25 has an inner diameter substantially equal to the outer diameter of the shank 16 and an outer diameter substantially equal to the diameter of the recess 12, the bushing being slidable over the tip shank and into the recess 12 until the inner end of the bushing bears upon the sealing member 21 and deforms the latter into fluid-tight sealing engagement with the shank 16, shelf 14 and recess 12. The outer end of the bushing is provided with a radial flange 26 which overlaps the outer end of the holder 10. The longitudinal split or slot in the bushing is indicated by reference numeral 27, Figure 3.

The outer end of the holder is provided with a number of axially extending slots 30, preferably four of them, 90 degrees apart. The outer diameter of the holder is reduced at the end, as indicated at 31, which is embraced by a U-shaped clamp 32. The two legs 33, 34 of the clamp 32 are interconnected by a bolt 35, extending through an aperture 36 in one leg 33 and into a threaded aperture 37 in the other leg 34. By tightening the bolt 35 the legs are drawn together to secure the end of the holder 10, the split bushing 25, and the tip shank 16 in rigid clamped relation.

It is now evident to those skilled in the art that this electrode is simple and inexpensive to manufacture, since there are no tapered fitting parts to machine nor any threaded interfitting parts except for the clamp bolt. As the clamp, bushing, and tip are all coaxial and are disposed one within another, the axial length of the assembly is a minimum. Except for the legs 33, 34 and bolt 35 at one side, the assembly is of minimum diameter, the same as the outer diameter of the holder 10, thus providing a very compact electrode which can be inserted into small spaces in parts to be welded, but in which the cooling fluid tubes and passages can be constructed of ample diameter.

When the tip 15 is worn and needs replacement, the disassembly can be easily and quickly accomplished by loosening the bolt, which is provided with a hexagonal socket 38 in its head to receive a suitable tool for the purpose. The clamp 32 can then be slipped off to release the bushing 25 and tip 15 without the necessity for unscrewing them or driving them out, as in the case of prior art assemblies. When the sealing ring 21 needs replacement, it can be easily lifted out of the recess 12 and a new one inserted and slipped in to the shelf 14 by inserting the bushing 25.

The inner end of the tip bears firmly on the end wall 17 apart from the sealing ring 21, avoiding any possibility of the latter being pinched between the end of the tip and the abutment wall 17. Since all of the cylindrical walls of the recesses 12, 13, the bushing 25, and the shank 16 can be kept clean, and since there are no tapered shanks or surfaces to become seized and scored, the electrical resistance will remain at a low value. Also, they will remain fluid tight to prevent leakage.

Figure 6:
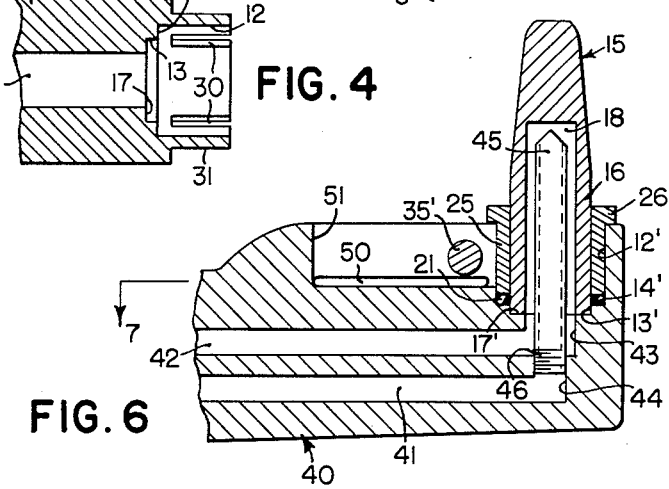
Figure 6 is a longitudinal sectional view, taken along a line 6—6 in Figure 5.
Figure 5:
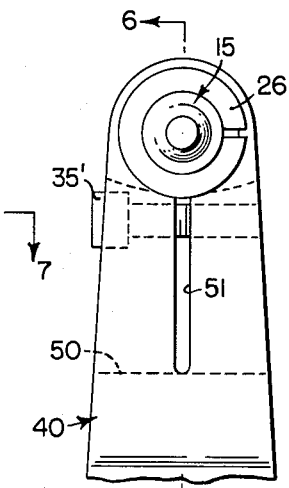
Figure 5 is a top plan view of another embodiment in which the tip is disposed at right angles to the holder.
Figure 7:
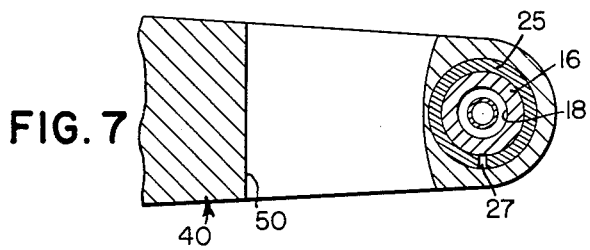
Figure 7 is a sectional plan view taken along a line 7—7 in Figure 6.

Referring now to the embodiment shown in Figures 5, 6 and 7, the holder 40 is of the angle type, used for purposes well known to those skilled in the art. The holder is provided with a cylindrical recess 12' disposed near the outer end of the holder 40 at right angles thereto. An inner recess 13' coaxial with the outer recess 12' provides a shelf 14' upon which the annular sealing member 21 is placed. The tip 15, split bushing 25 and sealing member 21 are common to both embodiments and are interchangeable. The arrangements of the recesses are similar to those in the first described embodiment, therefore corresponding parts are given like reference numerals to which prime suffixes have been added.

The holder 40 is provided with two fluid passages, one passage 41 for supplying the cooling fluid and the other passage 42 for exhausting the fluid. At the outer end of the holder, the upper or return passage 42 turns upwardly as indicated at 43 and the lower or supply passage 41 turns upwardly at 44 coaxially with the passage 43. A tube 45 has its lower end fitted into the upwardly turned passage 44 and suitably secured thereto, as by threads, at 46. The tube extends upwardly through the passage 43 into the recess 18 in the tip.

The holder is provided with a horizontal slot 50 and a vertical axially extending slot 51, which impart a slight flexibility to the holder whereby the sides can be drawn together by a clamping bolt 35' extending transversely of the holder perpendicular to the plane of the slot 51 for drawing the sides of the holder together to clamp the holder, the split bushing 25 and the tip 15 together in rigid relation.

It will be noted that this embodiment also has the advantages of compactness, ease of assembly and disassembly and low resistance to current flow as explained in connection with the first embodiment.

I do not intend to limit my invention to the particular details shown and described herein except as set forth in the claims which follow.

I claim:

1. A welding electrode comprising a holder having a fluid passage therein and a cylindrical recess at one end of said passage and in communication therewith, a cylindrical bushing slidably insertable into said recess, an annular deformable sealing member at the inner end of said recess against which the end of said bushing bears to deform said member, a tip having a cylindrical shank slidably insertable into said bushing and through said sealing member into abutment with the inner end of said recess, said tip having a recess in the inner end thereof in register with said water passage, and means for retaining said bushing and said tip in said holder, with said member deformed in sealing engagement with said recess, bushing and tip.

2. A welding electrode comprising a holder having a fluid passage therein and a cylindrical recess at one end of said passage and in communication therewith, a bushing having a cylindrical outer surface slidably insertable into said recess and a cylindrical inner surface, an annular deformable sealing member at the inner end of said recess against which the end of said bushing bears to deform said member, a tip having a cylindrical shank slidably insertable into said bushing and through said sealing member, the inner end of said recess having a cylindrical recess into which the end of said cylindrical shank slidably fits and abuts against the bottom thereof, said tip having a recess in the inner end thereof in register with said water passage, and means for retaining said bushing and said tip in said holder, with said member in sealing engagement with said recess, bushing and tip.

3. A welding electrode comprising a holder having a fluid passage therein and a cylindrical recess at one end of said passage and in communication therewith, there being a second cylindrical recess at the inner end of the first mentioned recess having a diameter less than said first mentioned recess to provide an annular shelf therein, a tip having a cylindrical shank of substantially the same diameter as said second recess and adapted to slidably fit therein, an annular deformable packing member adapted to encircle said shank in contact with said shelf, a split bushing having a cylindrical outer surface of substantially the same diameter as said first mentioned recess and a cylindrical inner surface of substantially the same diameter as said shank and slidably insertable over said shank and within said first mentioned recess into engagement with said packing member to deform the latter into tight sealing relation with said shank, said shelf, and said first mentioned recess, said tip having a recess in the inner end thereof in register with said water passage, and means for clamping said bushing upon said cylindrical shank and for retaining said bushing and tip in said holder with said member in sealing engagement therewith.

4. A welding electrode as set forth in claim 3, including the further provision that said holder has at least one slot extending axially along said recess, and said clamping means comprises a U-shaped clamp embracing said slotted holder and means for drawing said clamp together to secure said holder, said split bushing and said shank in clamped relation.

References Cited in the file of this patent

UNITED STATES PATENTS

| | | |
|---|---|---|
| 2,322,691 | Hensel | June 22, 1943 |
| 2,416,374 | Brumberg | Feb. 25, 1947 |
| 2,470,603 | Coulter | May 17, 1949 |